United States Patent [19]

Ham, Jr. et al.

[11] Patent Number: 4,983,955
[45] Date of Patent: Jan. 8, 1991

[54] ELECTRIC POWER SUPPLY CIRCUIT MONITORING SYSTEMS

[75] Inventors: Howard M. Ham, Jr., Santa Ynez; James J. Keenan, Santa Barbara, both of Calif.

[73] Assignee: Hendry Mechanical Works, Goleta, Calif.

[21] Appl. No.: 276,959

[22] Filed: Nov. 28, 1988

[51] Int. Cl.$^5$ ............................................. G08B 21/00
[52] U.S. Cl. ...................................... 340/664; 340/657; 340/661; 340/662; 340/663; 324/133; 361/93; 361/88; 323/274; 323/275
[58] Field of Search .................... 340/657, 661–664; 323/274–277; 324/133; 361/87, 93, 98, 86, 90, 88

[56] References Cited

U.S. PATENT DOCUMENTS

| | | | |
|---|---|---|---|
| 3,293,630 | 12/1966 | McKaig | 340/664 |
| 4,121,122 | 10/1978 | Pokrandt | 361/93 |
| 4,311,994 | 1/1982 | Kuribayashi | 340/662 |
| 4,558,310 | 12/1985 | McAllise | 340/663 |
| 4,583,086 | 4/1986 | Andrews | 340/664 |
| 4,628,303 | 12/1986 | Boyle | 324/133 |
| 4,631,623 | 12/1986 | Gohl | 361/90 |
| 4,707,758 | 11/1987 | Matsuda | 361/90 |
| 4,797,608 | 1/1989 | White | 340/663 |
| 4,837,672 | 6/1989 | Donze | 361/87 |
| 4,851,950 | 7/1989 | Ballada | 361/86 |

FOREIGN PATENT DOCUMENTS

0274274 12/1986 Japan .................................... 324/133

Primary Examiner—Donnie L. Crosland
Assistant Examiner—Kinfe-Michael Negash
Attorney, Agent, or Firm—Benoit Law Corporation

[57] ABSTRACT

Monitoring an electric power distribution circuit having a rated load capacity includes continually sensing an intensity of electric power supplied through that circuit. In response to that sensing a first signal indicating when electric power is supplied through that circuit at a predetermined maximum current usage below rated load capacity is provided. A second signal indicating a safe loading condition is provided when the sensed intensity is substantially below that maximum current usage. A third signal is provided when the mentioned intensity is at a value between the safe loading condition and the maximum current usage.

46 Claims, 3 Drawing Sheets

ELECTRIC POWER SUPPLY CIRCUIT MONITORING SYSTEMS

FIELD OF THE INVENTION

The subject invention relates to electric power supply or distribution systems, to electric power supply or distribution circuit monitoring systems, to systems for indicating the condition of electric power supply or distribution circuits, and of overload protective devices, and to fuse panels for telephonic equipment and other loads.

BACKGROUND OF THE INVENTION

A problem of relevance to this invention has been brought about by the habit of telephone equipment and other installers to add new load circuits to existing power supply circuits, such as in fuse panels and the like. In the past, telephone engineers in the central office listed each new addition in a log which continually apprised them of the load situation. However, deregulation, personnel cutbacks and increased admission of outside suppliers and equipment has brought about a decentralization which does no longer lend itself to the maintenance of reliable power distribution logs.

Also, standard fuse panels typically come with some twenty to forty output fuse positions, even when only a fraction thereof will use the entire capacity in a given situation. In that case, an installer often gains the erroneous impression that there is plenty of capacity left. He or she thus naturally will try to make use of the empty positions.

Little by little, the total load thus connected to the power supply circuitry would approach and eventually exceed rated load capacity. In this manner, a main fuse or other overload current interrupter would be caused to blow or trip, even though there is no overload condition in any one circuit supplied with power through that main fuse or overload current interrupter.

In consequence, an entire system or major parts thereof are suddenly and unexpectedly laid idle, even when there is nothing wrong with any load circuit or supply line in that system.

This can have disasterous consequences, such as when thousands of communication channels are suddenly interrupted, just because new equipment has been added to the system. However, that happens with increasing frequency, especially now that fiber optics long-distance channels are being installed all over the country. While this example is taken from the field of telephony, progressive overloading of power supply circuits through progressive addition of load circuits is also a problem in other areas.

In principle, an ammeter or similar measuring instrument could be employed to indicate to the installer or other concerned person when a safe limit has been reached. However, such instruments have in fact been disappearing from power supply panels, where they were used decades ago for other purposes, and it would not appear that expecting installers to continually read instruments would present a practical solution. Also, there is a difference between expecting an installer to read instruments on the one hand, and to provide positive alarms on the other.

In a different vein, light emitting diodes (LED's) have become increasingly popular as indicators, and there even is a type in which three different colors can be produced with two diodes. However, that as such does of course not solve the above mentioned problem.

There also has been a problem of obtaining a quick indication when either a main or input fuse or other overload current interrupter or an output fuse or further overload current interrupter of a power supply circuit has blown or tripped in response to one or more overload conditions.

A detailed inspection of the various fuses or other over-load current interrupters takes time and is subject to error by oversight. What is needed is a rapidly acting signaling system that differentiates between power interruption by a main fuse or overload current interrupter on the one hand, and the blowing or tripping of a fuse or overload current interrupter of lesser rank.

Moreover, there is a need for improved equipment that in effect pulls together the alarm conditions of different fuse panels or other circuits and provides a central indication of all alarms.

When monitoring fuses or other interrupters, a drawback also has been that prior-art monitoring equipment of an active type introduced reliability problems of its own. The need for passive monitoring systems thus has arisen.

SUMMARY OF THE INVENTION

It is a general object of this invention to overcome the problems and to meet the needs expressed above or otherwise apparent from this specification.

It is a related object of this invention to provide for an improved monitoring of power supplies, power distribution circuitry and/or fuses and other overload protection devices.

It is a germane object of this invention to provide a clear indication whenever a recommended maximum current usage of a supply system has been reached below rated capacity.

It is a related object of the invention to provide an assuring indication, as long as the loading condition is safe substantially below maximum current usage.

It is an auxiliary object of this invention to provide such other indications as are useful to optimum operation and utlization of protected power supply circuitry.

It is also an object of this invention to provide indications differentiating between the operation of a main fuse or overload current interrupter on the one hand, and a secondary fuse or overload current interrupter on the other hand.

It is also an object of this invention to provide an indication of the operation of a power supply.

It is a further object of the invention to provide centralized alarm indications.

It is also an object of the invention to provide improved fail-safe type of monitoring systems.

It is a further object of the invention to provide improved centralized alarm systems.

Other objects of the invention will become apparent in the further course of this disclosure.

From a first aspect thereof, the invention resides in a method or apparatus of monitoring an electric power supply distribution circuit having a rated load capacity, and, more specifically, resides in the improvement comprising in combination the steps of, or means for, supplying electric power through that circuit, continually sensing an intensity of the electric power supplied through that circuit, electrically providing in response to that sensing a first signal indicating when electric power is supplied through that circuit at a predetermined maximum current usage below rated load capacity, and electrically providing in response to that sensing a second signal indicating a safe loading condition when the sensed intensity is substantially below the maximum current usage.

From a second aspect thereof, the invention resides in a method or apparatus of monitoring electric power distribution circuits having rated load capacities, and, more specifically, resides in the improvement comprising in combination the steps of, or means for, supplying electric power through such circuits from a power supply, connecting a polarized relay to the power supply, energizing through the polarized relay a source for emitting light of one color when the power supply is in an operating condition, and deenergizing said polarized relay and emitting with said source light of another color when electric power through either of the circuits is at a maximum current usage predetermined for that circuit.

From a third aspect thereof, the invention resides in a method or apparatus of monitoring electric power distribution circuitry having input and output overload current interrupters, and, more specifically, resides in the improvement comprising in combination the steps of, or means for, emitting light of a first color when the input and output overload current interrupters are conducting electric current, emitting light of a second color when any output overload current interrupter has responded to an overload condition, and emitting light of a third color when any input overload current interrupter has responded to an overload condition.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
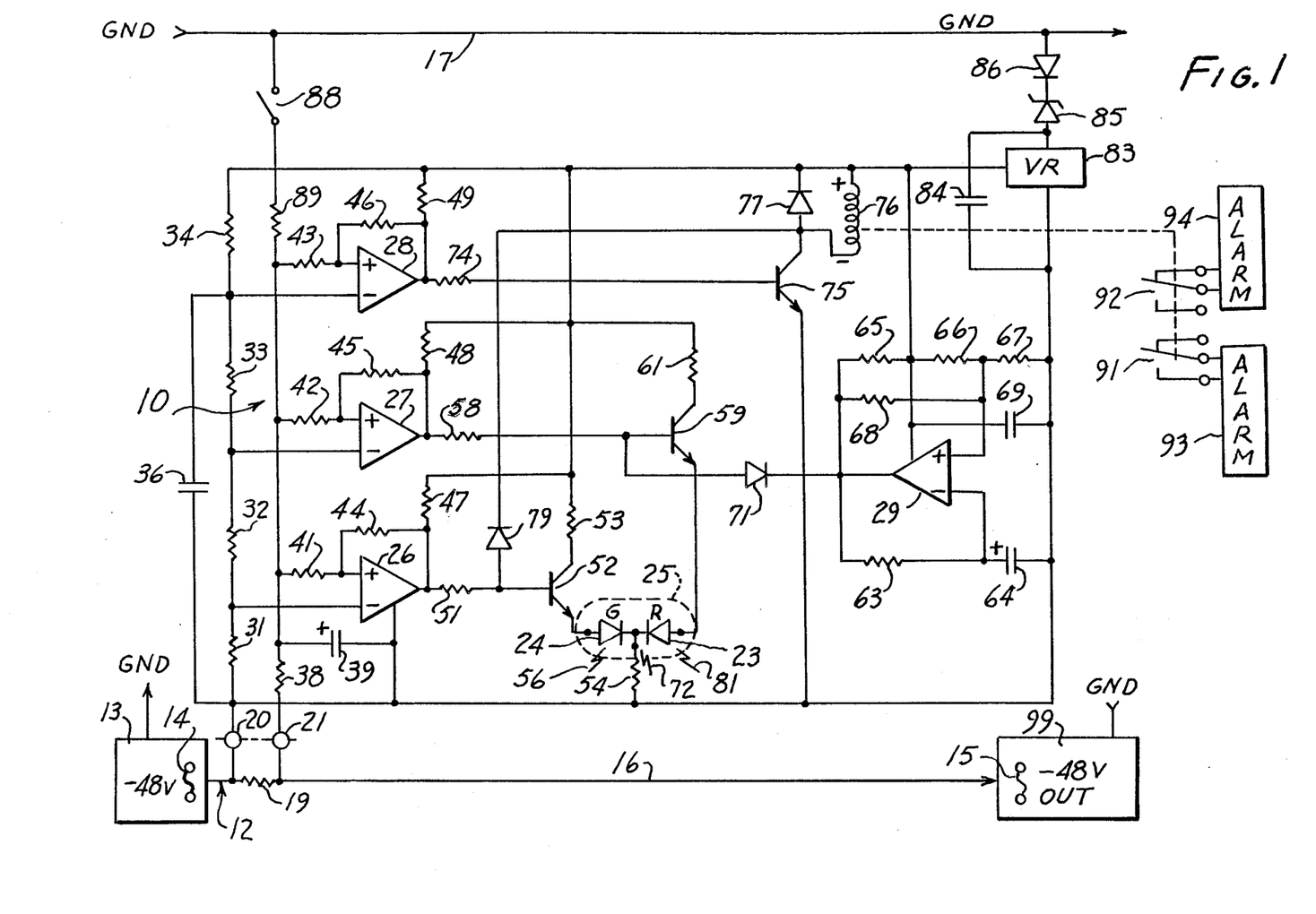
FIG. 1 is a diagram of a power distribution monitor according to a preferred embodiment of the invention.

The multi-level monitor 10 shown in FIG. 1 monitors an electric power supply or distribution circuit 12 having a rated load capacity. A power supply 13 is shown as a block, since the invention is not in its application intended to be limited to any particular regulated or unregulated power supply. However, a −48 V power supply for a telephone exchange is indicated by way of example. A fuse 14 is also shown in the power supply as symbolic of the rated load capacity of the power supply circuit. In practice, that fuse may in fact be symbolic of a fused or otherwise load-protected panel which has several fused or otherwise load-protected electric supply circuits. One or more fuses 15 may also be included at the output or load side of the power supply circuit. Electric power is supplied through a lead or bus 16 and also via ground 17, generally indicated in the drawings as GND at various places.

The electric power or current flowing in the −48 VDC bus 16 passes through a shunt resistor 19 of very low resistance. A voltage appears across that shunt resistor as a function of the amount of current flowing and the resistive value of the shunt. This voltage is applied to input terminals 20 and 21 of the monitor 10 and is used to sense the amount of current flowing in the −48 VCD bus. In this manner, the monitor may continuously sense an intensity of the electric power supplied through the power supply circuit 12. As more fully disclosed below, the monitor 10 electrically provides in response to such sensing a first signal indicating when the electric power supply is supplying electric power through the circuit 12 at a predetermined maximum current usage below rated load capacity, and electrically provides, also in response to such sensing, a second signal indicating a safe loading condition when the sensed intensity is substantially below that maximum current usage. In this manner, a conservative approach may in effect keep total load safely below maximum capacity.

In the illustrated preferred embodiment of the invention, two light emitting diodes (LED's) 23 and 24 are provided for emitting, respectively, light of a first color, such as red (R), in response to or as the above mentioned first signal when the electric power supply is supplying electric power through the circuit 12 at the predetermined maximum current usage, and alternatively light of a second color, such as green (G), or otherwise different from the first color, in response to or as the above mentioned second signal indicating a safe loading condition when the sensed current intensity is substantially below maximum current usage.

In this manner, the installer gets the "green light" as long as it is safe to connect further loads or fused load circuits to the power bus 16. Conversely, the installer gets the "red light" when his or her addition of loads or circuits has reached a recommended maximum value below rated load capacity. While such maximum current usage is safely below rated load capacity, the first signal or red light at 23 may, of course, persist even when rated load capacity has been reached or has been exceeded until the particular fuse 14 or other overload current interrupter has responded.

However, any supervisor and any installer receives a clear indication by the above mentioned first signal or "red light" at 23 when no more loads or load circuits are to be added to the particular bus or fuse panel.

In principle, the above mentioned second signal or "green light" for the addition of further loads or load circuits could be supplied as long as the sensed intensity of electric power supplied through the bus 16 is below recommended or predetermined maximum current usage. However, the illustrated preferred embodiment of the invention electrically provides, in response to the above mentioned sensing, a third signal indicating when the intensity of sensed power through the supply circuit 12 or bus 16 is at a value between a safe loading condition and the predetermined maximum current usage.

In this connection, the beneficial effect of the yellow warning light between the green light and the red light in a traffic signal may be recalled. However, such a similarity appears coincidental, since the purpose here is not to stop any vehicle or motion, but rather to caution against the addition of further load circuits. Nevertheless, three different light sources could be employed in the practice of the subject invention for emitting light of a first color, such as red, as the first signal, light of a second color, such as green, as the second signal, and light of a yet different third color as the cautionary third signal. However, the monitor according to the illustrated preferred embodiment of the invention shown in FIG. 1 energizes the LED's 23 and 24 in some combination, in order to provide light of a third signal or otherwise to supply a desired visual third signal. By way of preferred example, a combined light source 25 including the LED's 23 and 24 may be employed for emitting light of a third color or a visual third signal upon energization of the LED's 23 and 24, either simultaneously or alternatively.

In this manner, the preferred monitor 10 employs a single LED device 25 for displaying the flow of supply current at four levels, manifesting themselves by no LED emission at 25, emission at 23, emission at 24, and emission by a combined and/or alternating emission at 23 and 24.

While such emissions or indications can be realized in various ways by various means within the scope of the subject invention, FIG. 1 illustrates a preferred embodiment employing voltage comparators 26, 27, 28 and 29, and their associated circuits shown in FIG. 1.

In a prototype of the monitor 10, the comparators were provided in the form of Quad Single Supply Comparators, Type LM339, A, as shown and described, for instance, in the Motorola Linear and Integrated Circuits Handbook (1988), pp. 2–57 to 2–60, but other comparators may be employed within the scope of the invention.

By way of example, three voltage comparator circuits 26, 27 and 28 are stacked and referenced to the voltage divider network comprising series-connected resistors 31, 32, 33 and 34. Noise is decoupled from the reference divider network by a capacitor 36. The sense voltage from the shunt 19 is filtered by interconnected resistor 38 and capacitor 39 and then coupled to the three comparators 26, 27 and 28 via resistors 41, 42 and 43. Feedback resistors 44, 45 and 46 couple from the output back to the positive input of their respective comparator circuits to provide hysteresis for DC stability. Resistors 47, 48 and 49 are pull-up resistors for the comparator outputs.

Value selection for resistors 31, 32, 33 and 34 of the reference voltage divider network, will determine the sense voltage at which each comparator will change state. With no input the comparator outputs are at the low state. Until the first comparator changes state the monitor is at level one, and no light is emitted by the LED device 25 or by any component 23 and 24 thereof.

As the sense voltage across monitor input terminals 20 and 21 begins to rise in response to a turning on of the power supply and rise in intensity of the supplied power, the first comparator to change state low to high, will be 26. The output of that comparator 26 is coupled through a resistor 51 to the base of the green LED driver 52. That transistor 52 will saturate causing current to flow through the green LED 24. That green LED current is limited by resistors 53 and 54, and the resulting signal or green light 56 indicates level two.

When the intensity of the supplied power and thereby the sense voltage continue to rise, the next comparator to change state is 27. The output of the first comparator 26 will remain in the high state causing the green LED 24 to stay on.

When the output of the second comparator 27 changes state, low to high, a resistor 58 couples the change to the base of the red LED driver 59. That transistor 59 will saturate causing current to flow through the red LED 23. The red LED current is limited by resistors 54 and 61. Since equal current is now flowing through both sides of the two-color, red and green, LED 25, the combined colors appear as orange to the human eye with that kind of LED device.

Comparator 29 operates as a square wave oscillator with a cycle time of about two seconds. Timing for the square wave oscillator is established by the time constant of an R/C circuit including a resistor 63 and capacitor 64. A pull-up resistor 65 is connected to the output of oscillator 29. Resistors 66 and 67 provide fixed operating point bias while a resistor 68 injects positive feedback. Capacitor 69 decouples noise from the Vcc input of the quad comparator integrated circuit. The square wave oscillator 29 operates continuously.

The output of the square wave oscillator is coupled through a diode 71 to the base of the red LED driver 59. The square wave signal causes that transistor 59 to cut off and saturate at the rate of the oscillator 29, providing the output of comparator 27 is in the high state. This in turn causes the red LED 23 to switch on and off at the rate of the oscillator. When the red and green currents are equal the color appears as orange, symbolically indicated at 72. When the red only is switched off the color is green. With the green current flow constant and the red current switched on and off the LED device 25 appears to alternate between 56 and 72. This indicates what may be called level three at which the above mentioned third signal is emitted.

When the intensity of the power being supplied and thereby the sense voltage are still rising, the next comparator to change state is 28. Comparators 26 and 27 will remain in the high output state. When comparator 28 changes from low to high output state, that signal is coupled through a resistor 74 to the base of a relay driver 75. That transistor 75 will saturate causing a relay 76 to energize. Diode 77 will clamp the inductive overshoot that occurs when relay 76 is released. The collector of transistor 75 not only energizes the relay 76, but is also coupled through a logic diode 79 to the base of the green LED driver 52. When transistor 75 saturates, the base of the driver 52 is clamped low, causing that transistor 52 to switch off the green LED 24. The red LED driver 59 is still being driven by the high output state of comparator 27 and the square wave signal of oscillator 29. This combination causes the red LED 23 alone to flash on and off at the oscillator rate. Thus the red LED signal 81 may be flashing.

Accordingly, when comparator 28 changes state, relay 76 is energized and the LED 23 or LED device 25 flashes red. This indicates level four at which the maximum desired operating level for the power supply circuit 12 has been reached or exceeded.

A voltage regulator 83 may be employed to provide a stable voltage for the comparator and driver electronics and a regulated source for the reference divider network. Capacitor 84 reduces the dynamic input impedance of the regulator at higher frequencies. Zener diode 85 permits the regulator to operate within specified limits and reduces regulator power dissipation. Diode 86 protects against inadvertant polarity reversal.

By way of example, the voltage regulator 83 may be a Three-Terminal Low Current Positive voltage Regulator of the MC78L00, A, Series (e.g. MC7824) as shown and described, for instance, in the above mentioned Motorola Handbook, pp. 3-145 to 3-150.

When a test switch or button 88 is operated, current flow through a resistor 89 forces the monitor 10 into level four. Since level four causes all three monitoring comparators 26, 27 and 28 to change state and relay 76 to energize, the test switch 88 checks all critical circuits for operational readiness. When the test switch or button 88 is released, a quick flash of the green LED 24 occurs with the illustrated circuitry due to a capacitive charge. In this manner, the green LED 24 is specifically included in the test.

Several features provided by the illustrated preferred embodiment of the invention may be mentioned or reiterated at that point. For instance, preferred embodiments of the invention may provide one of the above mentioned first, second and third signals by alternating another of the first, second and third signals with a remaining one of these first, second and third signals. By way of example, it may be recalled that the monitor 10 alternates one signal, such as the emission of green light, with another signal or color, in order to produce a third signal or color.

Also within the scope of the illustrated preferred embodiment, one of the first, second and third signals may be combined with another of the first, second and third signals to provide a remaining one of these first, second and third signals. By way of example, the combination of the emission of green light 56 with the emission of red light 81 to produce an orange cautioning light 72 has been mentioned in conjunction with FIG. 1.

By way of specific example, the illustrated monitor 10 provides a combined signal by combining one of the first, second and third signals with another of these first, second and third signals, and by providing a remaining one of these first, second and third signals by alternating the combined signal with the one of the first, second and third signals. In terms of FIG. 1, this may, for instance, be implemented by providing an orange color signal 72 by combining the green and red color signals 56 and 81, and by providing the above mentioned third-level signal by alternating the combined orange color signal 72 with the green color signal 56, such as in the manner described above by saying that the LED device 25 appears to alternate between green 56 and orange 72.

Within the scope of the subject invention, any one or more of the first, second and third signals or color emissions may be flashing. By way of example, FIG. 1 shows square wave oscillator circuitry 29 for flashing the red signal 81 and the combined signal at 72 in the particular case.

In a practical application, the set points of the monitor may be such that the LED device 25 is off at power supply current intensities of less than 40% rated capacity. The green light 56 may be turned on when the supply current intensity has reached 40% rated load capacity. At 60% rated capacity, the orange emission 72 or combined green-orange flashing emission may be turned on as a cautionary signal. At 80% rated capacity, the red emission 81 may be turned on by itself, preferably in a flashing manner to indicate impending overloading. These values and colors are given by way of example to indicate a broader concept within the scope of the invention.

In practice, it is highly advantageous when the LED device 25 or an equivalent thereof is provided right on the fuse panel, so that any supervisor and installer is continuously apprised (a) when it is perfectly safe to add further load circuits to the panel, or (b) when subsequently the addition of further load circuits should proceed with caution (orange or alternating light 72), or (c) when still subsequently maximum utilization of the fuse panel has been reached (red signal 81, preferably flashing) and no further lead circuits must be added.

Corresponding or further signals may be provided externally of the fuse panel or power supply circuitry, such as with the aid of contacts 91 and 92 actuated by the relay 76. For instance, a normally open part of the relay contacts 91 may close a circuit actuating a warning light, bell or other alarm when the monitor 10 senses a "red alert" condition. Similarly, a normally closed part of the relay contacts 92 may actuate an alarm 94 which responds to an interruption of a quiescent current. This has the advantage that the alarm 94 not only will indicate a "red alert" condition, but also an interruption of the alarm wire.

With reference to the above mentioned test switch or button 88, FIG. 1 and its description are intended to supply a disclosure of methods and means for testing one of the above mentioned second and third signals and for providing after such testing of that one signal an automatic emission of the other of these first and second signals.

Figure 2:
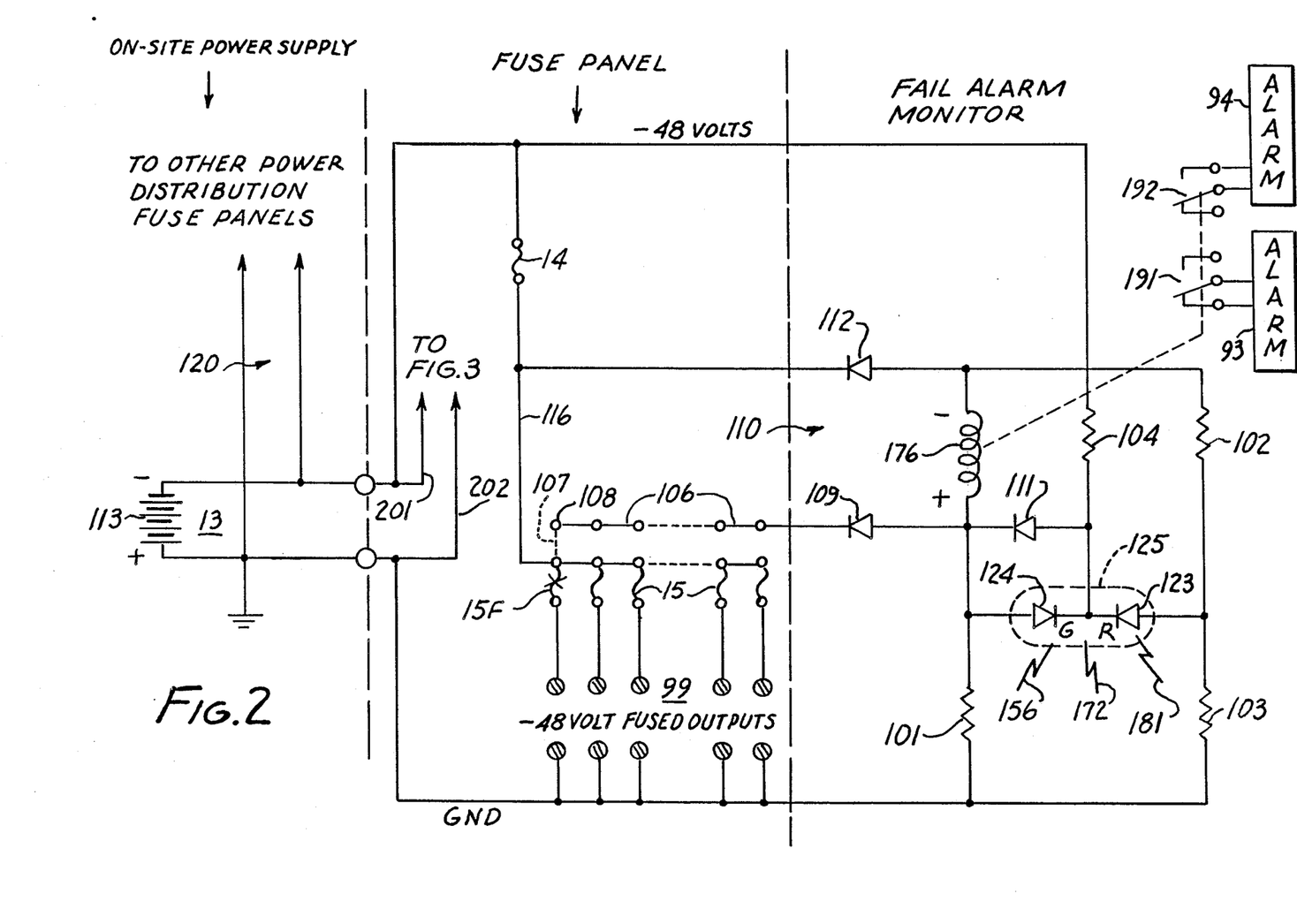
FIG. 2 is a diagram of a fuse monitor according to another embodiment of the invention.
Figure 3:
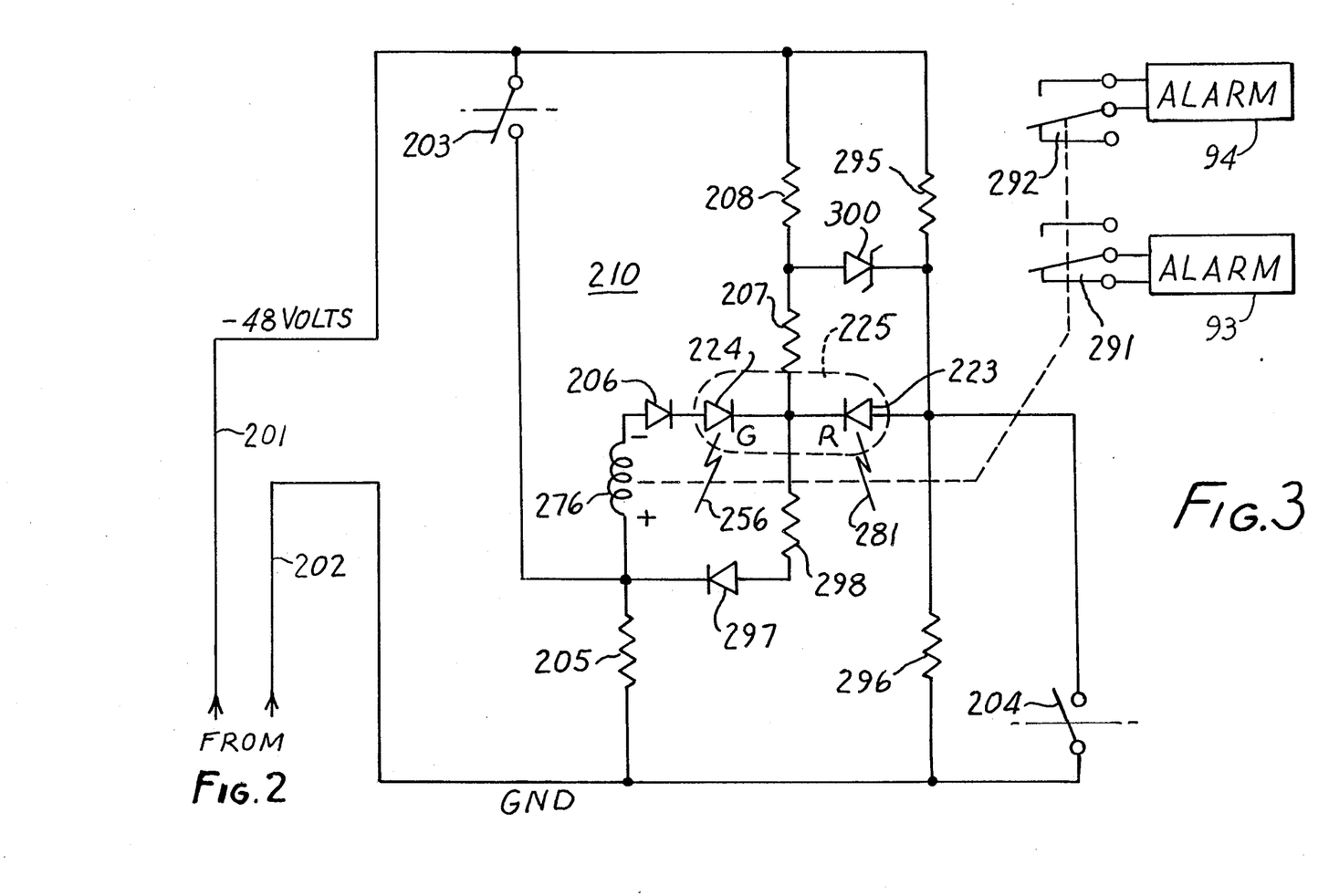
FIG. 3 is a diagram of a centralized alarm monitor according to a further embodiment of the invention.

The system of FIG. 1 may be employed in combination with either or both of the systems of FIGS. 2 and 3, or components shown in these latter figures may be employed in or for the monitor system shown in FIG. 1. In addition to using like reference numerals for like components, the prefatory digit "1" or the digit "2" has been employed in FIGS. 2 and 3 to indicate like or similar components with respect to FIG. 1, to the description of which reference may be had for a description of such like or similar components.

By way of example, FIG. 2 shows the power source 13 as including a battery or battery bank 113, such as used in telephone and other installations. Such an on-site battery or battery bank may also be employed in the power supply of FIG. 1. FIG. 2 also shows input and output fuses 14 and 15 of the type shown in and described in connection with FIG. 1. In fact, the input fuse 14 may be the same in FIGS. 1 and 2, and the fused output circuits may be present at 99 in FIG. 1, it being understood that the one output fuse in FIG. 1 then represents the several output fuses 15 shown in FIG. 2. Of course, where FIG. 2 shows a power supply lead 116 between the input fuse 14 and the output fuses 15, FIG. 1 would substitute therefor its power supply lead 16 with the series-connected shunt resistor 19 for the operation of the monitor 10 in surveying the electric power supply circuit 12.

FIG. 2 also shows apparatus for monitoring electric power supply circuitry, which may be used in conjunction with the monitor of FIG. 1 or independently or in conjunction with the equipment of FIG. 3 or with other apparatus.

In particular, during normal operation current passes through a resistor 101 and relay 176 causing that relay to remain energized. The voltage potential at the junction of relay 176 and its series-connected resistor 101 forms a fixed point bias for the anode of the green LED 124. The voltage potential at the junction of a resistive divider including resistors 102 and 103 forms a fixed point bias for the anode of the red LED 123. The resistance of the coil of relay 176 is greater than the resistance of resistor 102. Therefore the anode of the green LED 124 is more positive than the anode of the red LED 123. This allows current to flow through resistor 101, the green LED 124 and a resistor 104. This current is sufficient to cause the green LED 124 in the combined LED device 125 to glow. At this time the green LED is on, indicating normal operation, and the relay 176 is energized, providing hard contact outputs to which external alarm systems can be hooked up.

When any output fuse 15 fails, a fail alarm bus 106 will go to −48 volts. For example, the output fuses may be fuses as used in a typical power distribution fuse panel conventionally designed to apply the input voltage to a separate output terminal when the fuse fails as indicated for the fuse 15F in FIG. 2 by a dotted line 107. This separate output terminal is usually referred to as the fail-alarm (FA) terminal and a representative thereof is shown at 108 as connected to the fail alarm bus 106.

When one or more of such FA terminals are bussed together as at 106, the resulting fail-alarm bus potential will equal the input voltage, when any fuse fails. Accordingly, the junction of relay 176 and resistor 101 will be pulled to −48 volts through a coupling diode 109. This produces equal potential on both ends of the coil of relay 176, which will cause that relay to de-energize. The hard contacts of the relay 176 will change position, causing whatever external alarm systems 93, 94 connected to the relay outputs 191, 192 to activate. At the same time current will flow through diode 111, the red LED 123 and resistor 103. The green LED 124 will be back-biased off and the red LED 123 will be on. The red LED and de-energized relay 176 indicate a failed output fuse. Accordingly, the LED device 125 will emit a red warning light when one or more output fuses 15 have failed.

When the input fuse 14 fails, the only voltage applied to the fail alarm circuit is at resistor 104. The current flow then is through resistor 101, the green LED 124 and resistors 104, and also through resistor 103, the red LED 123 and resistor 104.

Resistors 101 and 103 are equal in value, so that the red and green LED currents will be nearly equal producing an orange color emitted by the LED device 125. To prevent back-loading of the fail alarm circuits when the input fuse fails, diodes 109 and 112 will disconnect the fail alarm circuits from the failed fuse busses. Relay 176 will be de-energized and the LED device 125 will appear orange, thereby indicating input fuse failure.

Since the contacts of relay 176 are two isolated form "C" hard contacts, any external alarm system can be actuated by 176 at currents up to the relay contact ratings.

Because normal operation holds relay 176 energized, even a coil failure in the relay will cause an alarm condition. Thus a "fail safe" alarm circuit is provided by the embodiment illustrated in FIG. 2

It may now be realized that the embodiment of the aspect of the invention shown in FIG. 2 provides a monitor 110 for monitoring electric power supply circuitry having input and output overload current interrupters, such as an input circuit breaker or fuse 14 and output circuit breakers or fuses 15.

In this context, the monitor 110 includes means for emitting light of a first color 156 when the input and output overload current interrupters or fuses 14 and 15 are conducting electric current or are intact. The monitor 110 also includes means for emitting light of a second color 181 when any output overload current interrupter or fuse 15F has responded to an overload condition. The monitor 110 includes further means for emitting light of a third color 172 when any input overload current interrupter or fuse 14 has responded to an overload condition. For instance, a circuit breaker may have tripped or a fuse may have been blown by an overload current.

In similarity to the embodiment of the monitor 10 shown in FIG. 1, a preferred embodiment pursuant to FIG. 2 provides one of the first, second and third colors by combining emission of light of another of these first, second and third colors with a remaining one of such first, second and third colors. By way of example, FIG. 2 discloses provision of an orange emission 172 in response to an input fuse failure by combination of the green emission 156 and the red emission 181.

The alarms or alarm circuits 93 and 94 described in conjunction with FIG. 1 may also be used with or activated by the monitor of FIG. 2, via contacts 191 and 192 of the relay 176, which is energized when all input and output fuses are intact.

As indicated at 120 in FIG. 2, other power distribution fuse panels including one or more of the monitoring apparatus of FIGS. 1 and 2 may be connected to the power supply 13 or power source 113 as well.

Considering the disclosure implicit in FIG. 2, the relay 176 may be seen as energizable means for effecting an alarm in a deenergized condition, such as through contacts 191 or 192. Conversely, such alarm is suspended as long as the relay 176 is energized. In this manner, an alarm is activated or given whenever the power supply fails. In practice, this is a valuable feature, especially in telephony and other applications where power is required to be on at all times.

In the embodiment illustrated in FIG. 2, the input fuse 14 and coupling diode 112, as well as the resistor 101 are connected to the relay 176 and to the LED 124 for suspending the alarm by energizing the relay 176 and for causing emission of the green light 156, as light of a first color, when the input and output overload current interrupters or fuses 14 and 15 are conducting electric current.

Means including the resistor 101, the fail alarm bus system 106 and 108, and the diode 109, are connected to the lower terminal of the relay 176, and are coupled to the output overload current interrupters or fuses 15, such as shown at 107, for activating the alarm 93 or 94 by deenergizing that relay 176. These means may also include the resistor 103 and diode 111 for energizing the red LED 123 causing emission of light of the second color 181 when any output overload current interrupter or fuse 15 has responded to an overload condition or has blown.

The connection of the upper terminal of the relay 176 to the output terminal of the input fuse 14 via diode 112 also provides means for activating the alarm 93 or 94 also by deenergizing the energizable means or relay 176 when any input overload current interrupter or fuse 14 has responded to an overload condition. As described above, light of a third color 176 is emitted at the same time to indicate that the input fuse 14 or similar overload current interrupter has blown or otherwise responded to an overload condition.

In this respect, resistors 101, 103 and 104 are representative of means for causing emission of light of a third color 172 when the latter input overload current interrupter or fuse 14 has responded to an overload condition.

Within the scope of the aspect of the invention illustrated in FIG. 2, the relay 176 may be deenergized and the alarm deactivated by energizing that relay equally at two sides either in response to the blowing of the input fuse 14 or in response to the blowing of any output fuse 15. Accordingly, one of the means for deenergizing the energizable means or relay 176 may include means for energizing such relay equally at two sides or at its upper and lower terminals, thereby causing deenergization of the energizable means or relay 176 for activating the alarm 93 or 94. In this respect, it may be recalled that the fail alarm bus system 106, 107 and 108 and diodes 109 and 112 provide equal potential at both ends or sides of the coil of relay 176, thereby deenergizing that relay.

A polarized relay may be used at 176. In that case, an internal magnetic field in the polarized relay may have to be overcome to switch the alarm contacts 191 and 192. Accordingly, the expression "equally at two sides," with respect to the relay 176 or to any equivalent means may have to be taken relatively to the nature of such relay or other equivalent means.

The provision of green as the first color 156, of red as the second color 181, and of orange as the third color 172 has only been given herein by way of example. For instance, within the scope of the subject invention, the circuit could be designed so that a red signal is emitted when the input fuse 14 fails, and that the orange signal is emitted when an output fuse 15 fails. Also, a color other than orange could be produced by combining the emission of two LED's. To give just one example, it is well known that a green emission can be produced by a mixture of yellow and blue.

The alarm circuit 210 according to the embodiment of the aspect of the invention illustrated in FIG. 3 may be employed in combination with the monitor or monitors 10 and/or 110. For example, FIGS. 2 and 3 show leads 201 and 202 connected to the power supply 13 or battery 113 which supplies electric power through the circuit 12 and to fuses 14 and 15 to loads at 99. As indicated at 120 in FIG. 2 and one or more other circuits having a rated load capacity may be connected to that power supply or battery, and FIG. 3 or an equivalent thereof within the scope of the invention may be employed to provide a centralized alarm for a number of supply circuits or alarm conditions.

As disclosed more fully below, an LED device 225 emits light of one color 256 when the power supply 13 or battery 113 is in an operating condition; but emits light of another color 281 when electric power through either of the circuits 12 or 120 is at a maximum current usage predetermined for that circuit. Like the power supply circuit 12, each of the power supply circuits 120 may have a monitor 10 of the type shown in FIG. 1.

A switch or contact 203 or 204 may then be closed, if maximum current usage has been reach ⒭d in one or more of the power supply circuits 12 and 120.

Alternatively or additionally, if the circuits 120 include a monitor of the type shown at 110 in FIG. 2, then either switch or contact 203 or 204 may be employed to cause emission of an alarm color 281.

Moreover, end users often have equipment that has an alarm or status signal that manifests itself as a closure to system ground or to system power. The circuit of FIG. 3 provides means to have direct application of system ground or system power activate an alarm indication. Switches 203 and 204 could be external switches or relays located in external equipment, but are shown as normally open contacts 203 and 204 for closure to system power and to system ground, respectively. By way of example, either switch 203 and 204 could be activated when the relay 76 in any monitor 10 indicates that a maximum current usage has been reached. Similarly, either switch 204 or 203 could be activated when the relay 176 in any monitor 110 becomes deenergized in response to the blowing of a fuse 14 or 15.

During normal operation current will flow through a resistor 205, relay 276, diode 206, the green LED 224, a resistor 207, and a resistor 208. A resistive divider 295 and 296 will back-bias the red LED 223 off. The LED device 225 accordingly will glow green and relay 276 will be energized, thereby keeping the alarms 93 and 94 off.

when closure of switch 203 occurs, the junction of resistor 205, relay 276 and the cathode of a diode 297 will go to −48 volts. Diode 206 will disconnect the junction of the negative terminal of relay 276 and the anode of the green LED 224. This will cause relay 276 to deenergize and the green LED 224 to stop glowing. Current will flow through diode 297, a resistor 298, the red LED 223 and resistor 296. The LED device 225 will glow red and the relay 276 will be deenergized. This indicates an alarm condition. For example, alarms 93 and 94 may be activated through relay contacts 291 and 292.

When closure of switch 204 occurs, the junction of resistor 296, the anode of the red LED 223, the cathode of a zener diode 300 and resistor 295 will go to system ground. This will cause the junction of resistors 207 and 298 and the LED commons to go to near system ground. Relay 276 and the green LED 224 will deenergize. However, current will flow through the red LED 223 and resistors 207 and 208 causing the LED device 225 to glow red. In particular, when the cathode of zener diode 300 is at system ground through switch 204, the voltage at the junction of resistors 207 and 208 is held to the zener voltage (e.g. −10 volts) referenced to system ground. This limits the current flowing in the red LED 223 to well within the specified limit. The red LED 223 will glow and relay 276 will be deenergized. This indicates an alarm condition, and the alarms 93 and 94 may be activated through relay contacts 291 and 293.

If switches 203 and 204 are both closed, current flows through the red LED, resistor 298 and diode 297 causing that red LED 223 to glow. Diode 206 would disconnect the junction of relay 276 and the green LED 224. The red LED 223 will glow and relay 276 will be deenergized. This indicates an alarm condition, and the alarms 93 and 94 may be activated through relay contacts 291 and 293.

The relay 276 is energized during normal operation, therefore if the power busses operating the monitor circuit or circuits, or the relay coil fails, the circuit will go to the alarm mode.

It may be recognized that FIG. 3 and the aspect of the invention it represents provide apparatus for monitoring an electric supply circuit having a bus 201 of one polarity and a bus 202 of another polarity, and having two LED's 223 and 224 connected back to back for emitting light of different colors 281 and 256, respectively. Means including a relay 276 are connected in series with one of said LED's 224 between the busses 201 and 202 for indicating normal operation of the electric power supply circuit by energizing that relay and energizing that one LED to emit light of one of said colors, such as green light 256. Means, such as the resistors 295 and 296, are connected to the electric supply circuit and the other of said two LED's for back-biasing that other LED 223 during such normal operation. Means are connected to the relay 276 and to a junction between said two LED's 223 and 224 for deenergizing in response to an alarm condition the one LED 224 and the relay with a potential derived from one of said busses, such as the bus 201 via switch 203, and for energizing the other LED 223 to emit light of another of said colors, such as red.

As indicated above, the latter means for deenergizing the one LED 224 and the relay include a unidirectional current conducting device 206 connected between that relay 276 and the one LED to disconnect that relay and that one LED 224 from each other in response to potential derived from the bus 201, such as by closure of the switch 203.

Further means, including for instance the switch 204, may be connected between the busses 201 and 202 and to the other LED 223 for energizing that other LED, such as with the aid of the zener diode 300, to emit light of another color 281, such as red, and for deenergizing the relay 276 as in response to another alarm condition, and for deenergizing the one LED 224, such as by causing the junction of LED's 223 and 224 to go near the other polarity or system ground, as described above.

Each of the components 203 and 204 may comprise several switches in parallel, especially when a centralized alarm for several power supply or distribution circuits or panels 12, 120, et. is desired or when alarms are otherwise to be centralized.

The subject extensive disclosure will render apparent or suggest to those skilled in the art various modifications and variations within the spirit and scope of the subject invention and equivalents thereof.

I claim:

1. In a method of monitoring an electric power distribution circuit having a rated load capacity, the improvement comprising in combination the steps of:
   supplying electric power through said circuit;
   continually sensing an intensity of said electric power supplied through said circuit;
   electrically providing in response to said sensing a first signal indicating when electric power is supplied through said circuit at a predetermined maximum current usage below rated load capacity; and
   electrically providing in response to said sensing a second signal indicating a safe loading condition when said sensed intensity is substantially below said maximum current usage.

2. In a method of monitoring an electric power distribution circuit having a rated load capacity, the improvement comprising in combination the steps of:
   supplying electric power through said circuit;
   continually sensing an intensity of said electric power supplied through said circuit;
   electrically providing in response to said sensing a first signal indicating when electric power is supplied through said circuit at a predetermined maximum current usage below rated load capacity;
   electrically providing in response to said sensing a second signal indicating a safe loading condition when said sensed intensity is substantially below said maximum current usage; and
   electrically providing in response to said sensing a third signal indicating when said intensity is at a value between said safe loading condition and said maximum current usage.

3. A method as claimed in claim 2, including the step of:
   providing one of said first, second and third signals by alternating another of said first, second and third signals with a remaining one of said first, second and third signals.

4. A method as claimed in claim 2, including the step of:
   combining one of said first, second and third signals with another of said first, second and third signals to provide a remaining one of said first, second and third signals.

5. A method as claimed in claim 2, including the steps of:
   providing a combined signal by combining one of said first, second and third signals with another of said first, second and third signals; and
   providing a remaining one of said first, second and third signals by alternating said combined signal with said one of said first, second and third signals.

6. A method as claimed in claim 1, including the steps of:
   testing one of said first and second signals; and
   providing after said testing of said one signal an automatic emission of the other of said first and second signals.

7. A method as claimed in claim 1, wherein:
   said first signal is provided by emitting light of a first color; and
   said second signal is provided by emitting light of a second color different from said first color.

8. A method as claimed in claim 7, including the step of:
   flashing an emission of one of said colors.

9. In a method of monitoring an electric power distribution circuit having a rated load capacity, the improvement comprising in combination the steps of:
   supplying electric power through said circuit;
   continually sensing an intensity of said electric power supplied through said circuit;
   electrically providing in response to said sensing a first signal by emitting light of a first color indicating when electric power is supplied through said circuit at a predetermined maximum current usage below rated load capacity;
   electrically providing in response to said sensing a second signal by emitting light of a second color different from said first color indicating a safe loading condition when said sensed intensity is substantially below said maximum current usage; and
   emitting light of a third color in response to said sensing when said intensity is at a value between said safe loading condition and said maximum current usage.

10. A method as claimed in claim 9, including the step of:
    combining emission of light of one of said first, second and third colors with another of said first, second and third colors to provide a remaining one of said first, second and third colors.

11. A method as claimed in claim 9, including the steps of:
    flashing an emission of one of said first, second and third colors; and
    flashing an emission of another one of said first, second and third colors.

12. In a method of monitoring an electric power distribution circuit having a rated load capacity, the improvement comprising in combination the steps of:
    supplying electric power through said circuit;
    continually sensing an intensity of said electric power supplied through said circuit;

electrically providing in response to said sensing a first signal by emitting light of a first color indicating when electric power is supplied through said circuit at a predetermined maximum current usage below rated load capacity;

electrically providing in response to said sensing a second signal by flashing light of a second color indicating a safe loading condition when said sensed intensity is substantially below said maximum current usage; and combining an emission of said first color and flashing light of a second color when said sensing indicates that said intensity is at a value between said safe loading condition and said maximum current usage.

13. In a method of monitoring an electric power distribution circuit having a rated load capacity, the improvement comprising in combination the steps of:
supplying electric power through said circuit;
continually sensing an intensity of said electric power supplied through said circuit;
electrically providing in response to said sensing a first signal by emitting light of a first color indicating when electric power is supplied through said circuit at a predetermined maximum current usage below rated load capacity;
electrically providing in response to said sensing a second signal by emitting light of a second color different from said first color indicating a safe loading condition when said sensed intensity is substantially below said maximum current usage;
testing an emission of said first color; and
providing after said testing an automatic emission of said second color.

14. A method as claimed in claim 1, including the steps of:
supplying electric power through said circuit from a power supply;
connecting another circuit having a rated load capacity to said power supply; and
emitting light of a predetermined color when electric power through either of said circuits is at a maximum current usage predetermined for that circuit.

15. A method as claimed in claim 14, including the step of:
emitting light of another predetermined color when said power supply is in an operating condition.

16. In a method of monitoring an electric power distribution circuit having a rated load capacity, the improvement comprising in combination the steps of:
supplying electric power through said circuit;
continually sensing an intensity of said electric power supplied through said circuit;
electrically providing in response to said sensing a first signal indicating when electric power is supplied through said circuit at a predetermined maximum current usage below rated load capacity;
electrically providing in response to said sensing a second signal indicating a safe loading condition when said sensed intensity is substantially below said maximum current usage;
providing an input of said circuit with a first overload current interrupter;
providing an output of said circuit with a second overload current interrupter;
emitting light of a first color when both said first and second overload current interrupters are conduction electric current;
emitting light of a second color when a predetermined one of said first and second overload current interrupters has responded to an overload condition; and
emitting light of a third color when the other one of said first and second overload current interrupters has responded to an overload condition.

17. A method as claimed in claim 16, including the step of:
providing one of said first, second and third colors by combining emission of light of another of said first, second and third colors with a remaining one of said first, second and third colors.

18. In a method of monitoring electric power distribution circuits having rated load capacities, the improvement comprising in combination the steps of:
supplying electric power through said circuits from a power supply;
connecting a polarized relay to said power supply;
energizing through said polarized relay a source for emitting light of one color when said power supply is in an operating condition; and
deenergizing said polarized relay and emitting with said source light of another color when electric power through either of said circuits is at a maximum current usage predetermined for that circuit.

19. In a method of monitoring electric power distribution circuitry having input and output overload current interrupters, the improvement comprising in combination the steps of:
emitting light of a first color when said input and output overload current interrupters are conducting electric current;
emitting light of a second color when any output overload current interrupter has responded to an overload condition; and
emitting light of a third color when any input overload current interrupter has responded to an overload condition.

20. A method as claimed in claim 19, including the step of:
providing one of said first, second and third colors by combining emission of light of another of said first, second and third colors with a remaining one of said first, second and third colors.

21. Apparatus for monitoring an electric power distribution circuit having a rated load capacity, comprising in combination:
first means for continually sensing an intensity of electric power supplied through said circuit;
second means connected to said first means for providing in response to said sensing a first signal indicating when electric power is supplied through said circuit at a predetermined maximum current usage below rated load capacity; and
third means connected to said first means for providing in response to said sensing a second signal indicating a safe loading condition when said sensed intensity is substantially below said maximum current usage.

22. Apparatus as claimed in claim 21, including:
fourth means connected to said sensing means for providing in response to said sensing a third signal indicating when said intensity is at a value between said safe loading condition and said maximum current usage.

23. Apparatus as claimed in claim 22, including:

means connected to said second, third and fourth means for providing one of said first, second and third signals by alternating another of said first, second and third signals with a remaining one of said first, second and third signals.

24. Apparatus as claimed in claim 22, including:
means connected to said second, third and fourth means for combining one of said first, second and third signals with another of said first, second and third signals to provide a remaining one of said first, second and third signals.

25. Apparatus as claimed in claim 22, including:
means connected to said second, third and fourth means for providing a combined signal by combining one of said first, second and third signals with another of said first, second and third signals, and for providing a remaining one of said first, second and third signals by alternating said combined signal with said one of said first, second and third signals.

26. Apparatus as claimed in claim 21, including:
means connected to said first and second means for testing one of said first and second signals, including means for providing after said testing of said one signal an automatic emission of the other of said first and second signals.

27. Apparatus as claimed in claim 21, wherein:
said second means for providing said first signal include means for emitting light of a first color; and
said third means for providing said second signal include means for emitting light of a second color different from said first color.

28. Apparatus as claimed in claim 27, wherein:
one of said second and third means includes means for flashing an emission of one of said colors.

29. Apparatus as claimed in claim 27, including:
fourth means connected to said sensing means for emitting light of a third color in response to said sensing when said intensity is at a value between said safe loading condition and said maximum current usage.

30. Apparatus as claimed in claim 29, including:
means connected to said second, third and fourth means for combining emission of light of one of said first, second and third colors with another of said first, second and third colors to provide a remaining one of said first, second and third colors.

31. Apparatus as claimed in claim 29, wherein:
one of said second and third means includes means for flashing an emission of one of said first, second and third colors, and for flashing an emission of another one of said first, second and third colors.

32. Apparatus as claimed in claim 21, wherein:
said second means for providing said first signal include means for emitting light of a first color;
said third means for providing said second signal include means for a flashing light of a second color; and
said fourth means include means for combining an emission of said first color and flashing light of a second color when said sensing indicates that said intensity is at a value between said safe loading condition and said maximum current usage.

33. Apparatus as claimed in claim 27, including:
means for testing an emission of said first color, and for providing after said testing an automatic emission of said second color.

34. Apparatus as claimed in claim 21, including:
a power supply for supplying electric power through said circuit;
another power distribution circuit having a rated load capacity and being connected to said power supply; and
means connected to said power distribution circuits for emitting light of a predetermined color when electric power through either of said circuits is at a maximum current usage predetermined for that circuit.

35. Apparatus as claimed in claim 34, including:
means connected to said power supply for emitting light of another predetermined color when said power supply is in an operating condition.

36. Apparatus as claimed in claim 21, including:
a first overload current interrupter at an input of said circuit;
a second overload current interrupter at an output of said circuit;
means for emitting light of a first color when both said first and second overload current interrupters are conducting electric current;
means for emitting light of a second color when a predetermined one of said first and second overload current interrupters has responded to an overload condition; and
means for emitting light of a third color when the other one of said first and second overload current interrupters has responded to an overload condition.

37. Apparatus as claimed in claim 36, wherein:
at least one of said light emitting means includes means for providing one of said first, second and third colors by combining emission of light of another of said first, second and third colors with a remaining one of said first, second and third colors.

38. In apparatus for monitoring electric power distribution circuits having rated load capacities and being connected to a power supply, the improvement comprising in combination the steps of:
means including a polarized relay connected to said power supply and including a light source connected to said polarized relay for emitting light of one color when said power supply is in an operating condition; and
means connected to said circuits and to said polarized relay for deenergizing said polarized relay and for emitting light of another color when electric power through either of said circuits is at a maximum current usage predetermined for that circuit.

39. In apparatus for monitoring electric power distribution circuitry having input and output overload current interrupters, the improvement comprising in combination the steps of:
means for emitting light of a first color when said input and output overload current interrupters are conducting electric current;
means for emitting light of a second color when any output overload current interrupter has responded to an overload condition; and
means for emitting light of a third color when any input overload current interrupter has responded to an overload condition.

40. Apparatus as claimed in claim 39, wherein:
at least one of said light emitting means includes means for providing one of said first, second and third colors by combining emission of light of another of said first, second and third colors with a remaining one of said first, second and third colors.

41. Apparatus as claimed in claim 39, including:

energizable means for effecting an alarm in a deenergized condition;

means connected to said energizable means and to said means for emitting light of a first color for suspending said alarm by energizing said energizable means and for causing emission of said light of a first color when said input and output overload current interrupters are conducting electric current;

means connected to said energizable means and to said means for emitting light of a second color, and coupled to said output overload current interrupters for activating said alarm by deenergizing said energizable means and for causing emission of said light of a second color when any output overload current interrupter has responded to an overload condition; and means connected to said energizable means for activating said alarm also by deenergizing said energizable means when any input overload current interrupter has responded to an overload condition.

42. Apparatus as claimed in claim 41, wherein:

said means for emitting light of a third color include means connected to said means for emitting light of a first color and to said means for emitting light of a second color for causing emission of light of a third color when the latter input overload current interrupter has responded to an overload condition.

43. Apparatus as claimed in claim 41, wherein:

one of said means for deenergizing said energizable means includes means for energizing said energizable means equally at two sides thereby causing deenergization of said energizable means for activating said alarm.

44. In apparatus for monitoring an electric distribution circuit having a bus of one polarity and a bus of another polarity, the improvement comprising in combination:

two LED's connected back to back for emitting light of different colors;

means including a relay connected in series with one of said LED's between said busses for indicating normal operation of said electric power supply circuit by energizing said relay and energizing said one LED to emit light of one of said colors;

means connected to said electric supply circuit and to the other of said two LED's for back-biasing said other LED during said normal operation;

means connected to said relay and to a junction between said two LED's for deenergizing in response to an alarm condition said one LED and said relay with a potential derived from one of said busses, and for energizing said other LED to emit light of another of said colors.

45. Apparatus as claimed in claim 44, wherein:

said means for deenergizing said one LED and said relay include a unidirectional current conducting device connected between said relay and said one LED to disconnect said relay and said one LED from each other in response to said potential.

46. Apparatus as claimed in claim 44, including:

means connected between said busses and to said other LED for energizing said other LED to emit light of another color and for deenergizing said relay in response to another alarm condition, and for deenergizing said one LED.

* * * * *